United States Patent [19]

Nakamura

[11] 3,998,992

[45] Dec. 21, 1976

[54] BONDING OF RUBBER TO METAL

[75] Inventor: Hiroshi Nakamura, Hyogo, Japan

[73] Assignee: Honny Chemicals Co., Ltd., Kobe, Japan

[22] Filed: June 18, 1975

[21] Appl. No.: 587,982

[30] Foreign Application Priority Data

June 26, 1974 Japan ............................. 49-73109
July 3, 1974 Japan ............................. 49-76166

[52] U.S. Cl. ................................. 428/451; 156/124; 156/110 A; 156/331; 156/334; 428/462; 428/469; 428/519; 428/521; 428/539

[51] Int. Cl.$^2$ .................. B32B 15/06; B32B 25/02

[58] Field of Search ............ 156/110 A, 124, 331, 156/334; 428/462, 461, 448, 539, 446, 451, 495, 519, 521, 469

[56] References Cited

UNITED STATES PATENTS

| | | | |
|---|---|---|---|
| 2,930,710 | 3/1960 | Koenecke et al. | 428/462 X |
| 2,978,377 | 4/1961 | Hall et al. | 428/462 |
| 3,408,252 | 10/1968 | Manganello | 428/519 |
| 3,832,271 | 8/1974 | Humphries et al. | 418/462 |
| 3,849,172 | 11/1974 | Chin et al. | 428/462 |
| 3,857,726 | 12/1974 | Van Gils | 428/462 X |

FOREIGN PATENTS OR APPLICATIONS 1,122,528   8/1968   United Kingdom

*Primary Examiner*—Harold Ansher
*Attorney, Agent, or Firm*—Stevens, Davis, Miller & Mosher

[57] ABSTRACT

The bond strength of composite articles of rubber adhered to ferrous metal substrates through an adhesive is substantially improved at ambient and elevated temperatures by using as the adhesive an interpolymer comprising a conjugated diene and a heterocyclic nitrogen base and by using a rubber containing about 5–60 parts of silica filler per 100 parts by weight of rubber, said silica having a purity on an anhydrous basis of at least 95%.

24 Claims, No Drawings

BONDING OF RUBBER TO METAL

This invention relates to a process for the bonding of rubber to ferrous metal substrates and to novel composite structures obtained by that process.

The vulcanization or the adhesion of rubber to metals has here-to-fore been accomplished by various processes. These include brass, bronze and zinc plating; the use of halogenated natural or synthetic rubbers with and without special adhesion promoting additives such as di-C-nitroso compounds or cobalt naphthenate, etc; isocyanates or isocyanate rubber blends; and synthetic resins of the phenol formaldehyde type. Each suffers from certain obvious weaknesses.

When a metal such as steel is plated with, e.g., brass and then contacted with a compounded vulcanizable rubber and the whole assembly heated under pressure, a strong bond is formed between the brass and rubber presumably due to covalent copper – sulfur – rubber linkages. This bond has good water and solvent resistance and is relatively unaffected by temperature. The weaknesses of this approach lie in the process. The brass plating process is expensive and difficult to control. Any variations in the brass composition an crystal structure thereof can result in very poor adhesion to rubber. The use of brass puts severe restraints on the rubber formulator for the rubber stock must be carefully formulated in order to get the optimum adhesion to brass. Bronze plating and zinc plating suffer from similar problems and limitations.

Chlorinated and brominated natural and synthetic rubbers, particularly when formulated to include cross-linking an adhesion promoting additives such as di-C nitrosated aromatics give good adhesive bonds between various metals and natural and synthetic rubbers. Because of their somewhat polar nature, they are able to adhere to metals without covalent bonding with the metal surface. This lack of a chemical bond to the metal surface is obviously a disadvantage for the adhesive strength of such systems falls much more rapidly with increasing temperature than similar metal to rubber combinations relying on a thin layer of brass for adhesion.

Polyfunctional isocyanates such as P, P', P'' triisocyanato triphenyl methane by themselves and as additives to rubber solutions have been known for many years to provide high bond strength between rubber and metals. While the mechanism of adhesion is not clearly understood, it is postulated that the isocyanates can chemically react with both the rubber and the metal surface. In the former case, active hydrogens, e.g., hydroxy or carboxyl groups generated by oxidation during rubber processing provide a reaction site for the formation of urethane and other linkages. In the bonding to the metal surface it has been suggested that oxide surfaces which frequently contain some hydroxy groups could react with the isocyanate group. In any event the solvent resistance and rate of reduction of bond strength with increasing temperature of isocyanate bonded rubber to metal parts is better than would be expected if the adhesion to metal were due only to physical forces. The isocyanate bond resembles the brass bond in these properties. The disadvantages of isocyanate based systems include high moisture sensitivity and very short pot life due to the highly reactive isocyanate groups and the poor thermal aging characteristics of this bond.

Synthetic resins of the phenol-formaldehyde type, usually blended with a rubbery polymer latex also can be used to bond rubber to metal. This sort of adhesive can chemically combine with an unsaturated rubber either by a migration of sulfur and accelerators from the rubber into the adhesive layer followed by a covulcanization or possibly by reaction of the methylol groups of the resole with the rubber itself. However the adhesion to the metal surface is physical in nature, i.e., Van der Waal type forces and the bond strengths to metal are generally poor, especially at elevated temperatures.

In U.S. Pat. No. 2,978,377 it is mentioned that copolymers of butadiene and a vinyl pyridine such as 2-methyl-5-vinyl pyridine have been used for bonding rubber to metal and that when used with natural rubber or a GRS (1,3 butadiene-styrene) composition an excellent bond is obtained. No mention is made of the strength of such bonds at elevated temperatures and no data is given. In any event, it has been found that there are many natural rubber and GRS compositions that if bonded to metals with copolymers of vinyl pyridines and butadiene result in very poor bond strengths even at normal ambient temperature.

The use of high purity silicas to reinforce vulcanized rubber compounds is well known art. There have also been some attempts to demonstrate that added silica increases the bond strengths of vulcanized rubber stocks to brass plated steel. British Pat. No. 1,122,528 claims that the combination of silica and cobalt naphthenate in a natural rubber stock increases the bond strength to a brass plated steel. It has been found, however that the increase in the bond strength (as opposed to increased bond durability) due to added silica is small and within the range of experimental error for the test method disclosed, and even if the difference is real, the effect can easily be explained as a filler effect rather than a silica effect.

The addition of 10 to 40 parts of carbon black instead of the 10 to 40 parts of silica would also increase bond strength by increasing the rubber strength. When the carbon black is partially replaced with finely divided high purity silica while maintaining a constant filler level in the compounded rubber, the brass to rubber bond strength often does not change or may even decrease. In any event, when compounded rubbers are bonded to brass, bronze or zinc plated surfaces, an essential component of such bond formation is the reaction of the sulfur present in the rubber with both the rubber and the plated metal, presumably to form covalent rubber – sulfur – metal linkages. This, of course, involves a totally different bonding mechanism than the present invention where brass, bronze, or zinc plating is not used.

The purpose of the present invention is to bond compounded vulcanizable rubbers to ferrous metals, especially iron and steel, without the use of an intermediate layer of brass, bronze or zinc and thereby eliminate the expense, quality control problems, etc. associated with the use of such metal coatings.

Another object of the present invention is to bond rubber to ferrous metal, especially steel bead wire and cord for use in steel reinforced tires, belts and hoses by using as the adhesive, rubbery copolymers and interpolymers of conjugated dienes and heterocyclic nitrogen bases and without the presently used intermediate layer of brass, bronze or zinc on the wire or cord surface.

Still another object of this invention is to provide a bond between the steel wire or cord and the surrounding rubber that will retain a large measure of its bond strength at the elevated temperatures often encountered during the use of the aforementioned tires, belts etc.

It has now been found that when using adhesives comprising interpolymers of conjugated dienes and heterocyclic nitrogen bases to bond rubbers to iron or steel surfaces, the addition of high purity finely divided silica to the rubber stock to be bonded results in unexpectedly high bond strengths particularly at elevated temperatures. Moreover, this effect is clearly not a filler level effect. As will be obvious from examining the following examples, the replacement of part of the usual carbon black filler in a rubber stock with an equal weight of finely divided high purity silica results in unexpectedly large increases in the bond strength with the instant copolymer adhesives, even though the filler level is unchanged.

The reason for this remarkable increase in bond strength with added silica is not well understood. The magnitude of the effect shows that it is definitely not merely due to a change in the physical properties of the rubber to be bonded with the addition of silica but some more basic interaction of rubber and adhesive.

The rubbery interpolymers used as the adhesive in the present invention may be copolymers of a conjugated diene with a heterocyclic nitrogen base or interpolymers of the above with at least one additional copolymerizable monomer. Those polymers applicable in the present invention are comprised of about 39-99% by weight of the conjugated diene, about 1-60% by weight of a heterocyclic nitrogen base and 0 to about 40% by weight of at least one additional copolymerizable monomer.

Within these limits the compositions of the copolymers can be varied widely without sacrificing the excellent hot bond strengths achieved with this invention. Commercially, due to the expense of, e.g., vinyl pyridines, copolymers with relatively low levels of copolymerizable heterocyclic nitrogen base are preferred and amounts as low as 1% have been found to be effective.

These copolymers can be prepared by any method known in the art such as thermal, solution, suspension, mass, and emulsion polymerization. The copolymerization can be free radical or anionic, random, block or stereospecific. The preferred method is by emulsion polymerization.

The conjugated dienes useful in this invention are preferably those which contain four to six, inclusive, carbon atoms per molecule but those containing more carbon atoms per molecule, e.g., eight can also be used. These compounds include hydrocarbons such as 1,3 butadiene, isoprene, piperylene, methyl pentadiene, 2,3 dimethyl-1,3-butadiene, 2,3-diethyl-1,3-butadiene, halohydrocarbons such as haloprenes, e.g., chloroprene, methyl chloroprene and others; and alkoxy hydrocarbons such as methoxy and ethoxy derivatives of the above conjugated dienes, e.g., 2 methoxybutadiene and 3-ethoxy-1,3-butadiene.

The polymerizable heterocyclic nitrogen bases which are applicable to this invention are those of the pyridine, quinoline, and isoquinoline series which are copolymerizable with a conjugated diene and contain one and only one $CH_2=C<$ substituent and preferably the group is

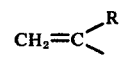

where R is either a hydrogen or a methyl group. That is, the substituent is either a vinyl or an alphamethylvinyl (isopropenyl) group. Of these compounds, the pyridine derivatives are preferred. Various substituted derivatives are also applicable but the total number of carbon atoms in the nuclear substituted groups, such as alkyl groups, should not be greater than 15 because the polymerization rate decreases somewhat with increasing size of the alkyl group. Compounds where the alkyl substituents are methyl and/or ethyl are available commercially and are preferred in this invention.

These heterocyclic nitrogen bases have the formula

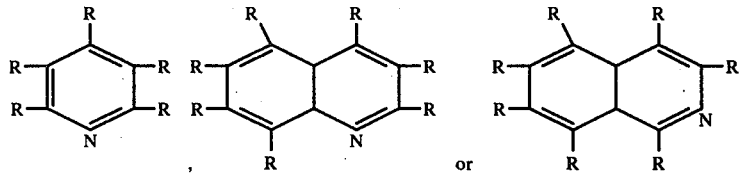

where R is selected from the group consisting of hydrogen, akyl vinyl, alpha-methylvinyl, alkoxy, halo, hydroxy, cyano, aryloxy, aryl and combinations of these groups such as halo-alkyl, alkylaryl, hydroxyaryl, and the like, one and only one of said groups being of the type $CH_2=C<$ and preferably being a vinyl or alphamethyl vinyl group; and the total number of carbon atoms in the nuclear substituted groups being not greater than 15. As has been indicated, the preferred compounds are those wherein the R groups, other than the vinyl or alphamethylvinyl group, are hydrogen or alkyl of 1 to 4 carbon atoms. Examples of such compounds are 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6- ethoxy-7-methylquinoline; 3-vinyl-6-hydroxymethylisoquinoline; and the like.

Interpolymers can be prepared from a mixture of two of the previously mentioned conjugated dienes and a hetrocyclic nitrogen base or from a conjugated diene and two different hetrocyclic nitrogen bases. It is, however, more common to prepare interpolymers from a single conjugated diene, a single hetrocyclic nitrogen base and at least one other polymerizable monomer. The latter monomers comprise organic compounds containing at least one polymerizable ethylenic group of the type >C=C<. These compounds are well known in the art and include, for example, the alkenes, alkadienes, and the styrenes such as ethylene, propylene, 1-butylene, 2-butylene, isobutylene, 1-octene, 1,4-pentadiene, 1,6-hexadiene, 1,7-octadiene, vinyltoluene, vinylxylene, ethylvinylbenzene, vinylcumene, 1,5-cyclooctadiene, cyclohexene, cyclooctene, benzylstyrene, chlorostyrene, bromostyrene, fluorostyrene, trifluoromethylstyrene, iodostyrene, cyanostyrene nitrostyrene, N,N-dimethylaminostyrene, 3-phenyl-3-butene-1-ol, p-methoxystyrene, vinyl naphthalene, acetoxystyrene, methyl 4-vinylbenzoate, phenoxystyrene, p-vinylphenyl ethyl ether, and the like; the acrylic and substituted acrylic monomers such as methyl acrylate, ethyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alphachloroacrylate, ethyl alphaethoxy-acrylate, methyl alpha-acetamidoacrylate, butyl acrylate, ethyl alphacyanoacrylate, 2-ethylhexyl acrylate, phenyl acrylate, phenyl methacrylate, alpha-chloroacrylonitrile, ethyl methacrylate, butyl methacrylate, methyl ethacylate, methacrylamide, N,N-dimethylacrylamide, N,N-dibenzylacrylamide, N-butylacrylamide, methacrylyl formamide, and the like; the vinyl esters, vinyl halides, vinyl ethers, vinyl ketones, etc., such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene cyanide, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, tetrafluoroethylene, chlorotrifluoroethylene, nitroethylene, vinyl furane, vinyl carbazole, vinyl acetylene, and the like.

The function of the additional monomer can be merely that of cost reduction with little or no influence on the bond strength and other properties of the adhesive or it may be incorporated to modify a specific property of the adhesive. An example of this would be the incorporation of monomers such as nitriles, esters, amides, etc. that would increase the polarity of the adhesive to make it more compatible with rubbers of higher polarity. Such modifications can easily be made by those skilled in the art and are considered to lie within the scope of this invention.

The high purity finely divided silicas useful in the practice of this invention include all finely divided silicas with a $SiO_2$ content of 95% or more on an anhydrous weight basis, such as Hi-Sil 233 (PPG Industries), Syloid 65, 83, 85, 244 and 255 (Fuji-Davison), Syloid AL-1, 72, 73, 75, 161, 162, 308, 404, 978 (Davison Chemical) Silnex NP-8 (Mizusawa Kagaku), Cab-O-Sil (G. L. Cabot Corp.), Fransil 251 (Fransol), Aerosil TT 600, S, O, ALO111/200, 2491 (Degussa), Aerosil 130, 200, 300, 380, 0, OX50, MOX170, R972 (Nippon Aerosil KK).

These finely divided silicas may be added as a dry powder to the rubber stocks via the usual processing methods such as on an open mill or in a internal mixer or alternatively they may be added as a water slurry or a stable silica sol to the rubbery polymer latex and this mixture treated with an acid etc. to coprecipitate the rubber and silica masterbatch.

The aqueous silica sols that can be used include Snow Tex 20, 30, C, N, and O (Nissan Kagaku); Ludox HS, LS, SM and AM (Du Pont); Syton DS, P, W – 200, and 200 (Monsanto); and Nalcoag 1030, 1034, 1035, and 1050 (Nalco).

Silica particle size, irrespective of whether the silica is milled into the rubber as a powder or coprecipitated with the rubber from a latex — silica mixture, is generally in the range of 3 to 60 m$\mu$.

In order to achieve good bond strength with the copolymer adhesives of this invention the compounded vulcanizable rubbers should contain from 5 to 60 parts, and preferably from 20 to 50 parts of high purity finely divided silica per 100 parts of unsaturated rubber. The silica may be used as the only filler or it may be used in conjunction with other reinforcing or non-reinforcing fillers such as carbon blacks, clays, etc. Generally it is preferred in the practice of this invention to use a mixture of silica and other fillers, especially the various carbon blacks in order to maximize the bond strength and the physical properties of the vulcanized rubbers without unduly increasing the compounded rubber cost with the more expensive silica fillers.

The silica compounded rubbers that may be bonded by the aforementioned interpolymers include natural and synthetic rubbers and their blends having a fairly high degree of unsaturation, i.e., having a minimum of about 70 mole percent polymerized conjugated diene. Examples of suitable synthetic rubbers are polybutadiene, polyisoprene, copolymers of butadiene with styrene or acrylonitrile, polychloroprene etc. The compounded rubbers, in addition to the finely divided high purity silica, may contain all of the compounding ingredients normally used in preparing vulcanizable rubbers. Thus in addition to the silica one or more other fillers may be incorporated as well as the usual plasticizers, processing aids, curatives and antioxidants. The total amount of filler used is generally in the range of 25 to 150 parts by weight per 100 parts by weight of rubber.

Examples of suitable fillers that can be used in conjunction with the finely divided high purity silicas include the various clays, calcium carbonate, calcium silicate, titanium dioxide and carbon black. In preparing compounded stocks to be employed in the fabrication of tires, it is generally preferred that at least a portion of the filler be carbon black. The plasticizers are generally used in amounts ranging from 1.0 to 100 parts by weight of plasticizer per 100 parts by weight of rubber. The amount of plasticizer actually used will depend upon the softening effect desired. Examples of suitable plasticizers include aromatic extract oils, petroleum softeners including asphaltene, saturated and unsaturated hydrocarbons and nitrogen bases, coal tar products, cumarone-indene resins, and esters such as dibutyl phthalate, and tricresyl phosphate. It is to be understood that mixtures of these plasticizers can be employed. Processing aids may include such materials as the metal salts of naphthenates, linoleates, stearates, oleates, acetates, resinates etc. Generally the cobalt salts are most often used but many others such as iron, nickel, copper, aluminum etc are also effective. The total amount of such materials is generally in the range of 0.05 to 2.0 parts by weight of metallic element per 100 parts by weight of rubber. The curatives used in the curing system include a vulcanizing agent, and generally one or more vulcanization accelerators together with one or more accelerator activators. The amount of these materials used in the system generally falls in the following ranges: 0.5 to 5.0 parts by weight of the vulcanizing agent, 0.5 to 3.0 parts by weight of the accelerator, 0.5 to 20.0 parts by weight of the accelerator activator, all ranges being based on 100 parts be weight of rubber. Examples of suitable vulcanizing agents are sulfur, sulfur-liberating agents, such as thiuram disulfide, a thiuram polysulfide, or an alkylphenolsulfide, or a peroxide, such as dicumyl peroxide, or dibenzoyl peroxide. When peroxide compounds ar used as vulcanizing agents, the accelerator and the accelerator activator are frequently unnecessary. Vulcanization accelerators which can be used include dithiocarbamates, thiuram sulfides, and mercaptobenzothiazoles. Examples of specific compounds which are suitable vulcanization accelerators include zinc diethyldithiocarbamate, N,N-di-methyl-S-tert-butylsulfenyldithiocarbamate, tetramethylthiuram disulfide, 2,2'-dibenzothiazyl disulfide, butyraldehydeaniline, mercaptobenzothiazole, N-oxydiethylene-2-benzothiazole sulfenamide, and the like.

Materials used in the compounding which function as an accelerator activator include metal oxides such as zinc oxide, magnesium oxide and litharge, which are used in conjunction with acidic materials such as fatty acids, for examples, stearic acid, oleic acid, myristic acid, and the like. Rosin acids can also be employed as the acidic material. An antioxidant is usually included in the compounding recipe in an amount ranging, for example, from 0.5 to 3.0 parts be weight per 100 parts by weight of rubber. Examples of suitable antioxidants include phenyl-$\beta$-naphthylamine, di-tert-butylhydroquinone, 2,2,4-trimethyl-6-phenyl-1,2-dihydroquinoline, a physical mixture of a complex diarylamine-ketone reaction product and N,N'-diphenyl-p-phenylenediamine, and the like.

The interpolymer adhesive properties can be modified, e.g., tackiness, hardness and the stability against oxidation, by adding one or more of fillers, plasticizers, curatives and antioxidant into the adhesive before the application onto the metal surface.

It is to be understood that it is not intended to limit the invention to any particular compounding recipe, for the invention is broadly applicable to the use of silica in a wide range of compounded rubber formulations in order to obtain a high bond strength with the adhesives. The adhesives of this invention exhibit useful adhesion on ferrous (steel and iron) surfaces that have preferably been degreased and freed of any weakly adherent oxide coatings by etching.

The adhesives are coated on the ferrous surface by any of the usual methods such as dipping, brushing, spraying, etc., and then dried briefly at room temperature or by the application of heat to remove solvents and/or water. The compounded rubber stock is then contacted with the adhesive surface and the whole assembly vulcanized with heat and pressure to complete the bonding process.

The invention will be better understood by reference to the following illustrative examples which are not to be considered as limiting the invention. All parts are by weight.

EXAMPLE 1

Steel bead wires (d=0.96mm) were solvent degreased, cleaned by dipping briefly in hot concentrated hydrochloric acid, rinsed with water and then dipped into a butadiene, 2-vinyl pyridine copolymer latex (composition 85:15, 12% resin solids) and then dried at 170° C. for 60 seconds. The coated bead wires were vulcanized in an H-test mold at 135° C. for 60 minutes under 60Kg/cm$^2$ pressure with the following compounded rubber formulations. After vulcanization the test samples were aged 24 hours at room temperature and then heated to and tested at 120° C. using a test rate of 200mm/minute. As seen from the data the bond strengths with the copolymer adhesive increase rapidly with higher levels of silica in the rubbers. The examples with bentonite and activated clay show clearly that mineral fillers with silica contents of less than about 95% are not effective for providing improved bond strength with these copolymer adhesives.

The Hi-Sil 233 and Syloid 244 silicas in the following tables have respectively a specific gravity of 1.95 and 1.96, an average particle size in millimicrons of 22 and 1/2 3.3, a surface area in square meters per gram of 150 and 300, a pH of 7.3 and 7.0 and percent silica on an anhydrous basis of 96.7 and 99.3. The bentonite and activated clay have respectively a specific gravity of 2.58 and 2.4, an average particle size in millimicrons of 53,000 and 43,000, a surface area of 1.0 and 220 in square meters per gram, a pH of 9.4–10.3 and 3–5 and percent silica on an anhydrous basis of 76.5 and 82.

TABLE 1

| TEST NO. | Comparison | 1 | 2 | 3 | Comparison | 4 | 5 | 6 | 7 | 8 | Comparison | Comparison |
|---|---|---|---|---|---|---|---|---|---|---|---|---|
| Natural Rubber (Smoked Sheet) | 100 | 100 | 100 | 100 | 100 | 100 | 100 | 100 | 100 | 100 | 100 | 100 |
| MPC Black | 70 | 40 | 25 | 15 | 70 | 65 | 60 | 40 | 15 | 40 | 40 | 40 |
| Hi-Sil 233 | — | 30 | 45 | 55 | — | 5 | 10 | 30 | 55 | — | — | — |
| Syloid 244 | — | — | — | — | — | — | — | — | — | 30 | — | — |
| Bentonite | — | — | — | — | — | — | — | — | — | — | 30 | — |
| Activated Clay | — | — | — | — | — | — | — | — | — | — | — | 30 |
| Zinc Oxide | 8 | 8 | 8 | 8 | 8 | 8 | 8 | 8 | 8 | 8 | 8 | 8 |

TABLE 1-continued

| TEST NO. | Comparison | 1 | 2 | 3 | Comparison | 4 | 5 | 6 | 7 | 8 | Comparison | Comparison |
|---|---|---|---|---|---|---|---|---|---|---|---|---|
| Stearic Acid | 1 | 1 | 1 | 1 | 1 | 1 | 1 | 1 | 1 | 1 | 1 | 1 |
| Pine Tar | 3 | 3 | 3 | 3 | 3 | 3 | 3 | 3 | 3 | 3 | 3 | 3 |
| Sulfur | 5 | 5 | 5 | 5 | 5 | 5 | 5 | 5 | 5 | 5 | 5 | 5 |
| Phenyl β-Naphthylamine | 1 | 1 | 1 | 1 | 1 | 1 | 1 | 1 | 1 | 1 | 1 | 1 |
| Cobalt Naphthenate | 2.5 | 2.5 | 2.5 | 2.5 | — | — | — | — | — | — | — | — |
| 2-Mercapto-benzothiazole | 1.5 | 1.5 | 1.5 | 1.5 | 1.5 | 1.5 | 1.5 | 1.5 | 1.5 | 1.5 | 1.5 | 1.5 |
| H-Test Results with Copolymer Adhesive (Kgs/2cm) at 120° C. | 15 | 37 | 39 | 48 | 27 | 35 | 39 | 48 | 55 | 43 | 27 | 12 |

Rubber formulations are given in parts by weight. Test No. 6 was repeated changing the test condition to room temperature. The adhesive strength measured by the H-test was 68Kg/2cm. Failures occurred inside the rubber stock since pulled out wires from test blocks tested at both room temperature and 120° C. were covered by the rubber stock completely.

EXAMPLE 2

Steel bead wires (d=0.96mm) were solvent degreased and cleaned as in Example 1, then dipped into a butadiene, 2-vinyl pyridine copolymer latex (12% resin solids) and then dried at 170° C. for 60 seconds. The coated bead wires were vulcanized in an H-test mold at 145° C. for 90 minutes under 60Kg/cm$^2$ pressure with the following compounded natural rubber formulation.

Table 2

| | |
|---|---|
| Natural Rubber No. 1 (Smoked Sheet) | 100 |
| MPC Black | 40 |
| Hi-Sil 233 | 30 |
| Zinc Oxide | 10 |
| Pine Tar | 4 |
| Phenyl β-Naphthylamine | 1 |
| 2(2,4 Dinitrophenol)mercaptobenzothiazole | 1 |
| Sulfur | 3.5 |
| Cobalt Naphthenate | 5 |

Utilizing the following copolymer compositions, the listed H-test results were obtained.

Table 3

| Test No. copolymer composition | Comp | 1 | 2 | 3 | 4 |
|---|---|---|---|---|---|
| wt % Butadiene | 100 | 99 | 85 | 60 | 40 |
| wt % 2-vinyl pyridine | 0 | 1 | 15 | 40 | 60 |
| H-Test Results (Kgs/2cm) at 120° C. | 30 | 42 | 50 | 55 | 49 |

EXAMPLE 3

Example 1 was repeated with the following changes in vulcanization conditions and rubber to be bonded.

The H-Test employed in this and the other examples is conducted by vulcanizing the coated wire into the center of two blocks of rubber each having a width and length of 2 cm and a thickness of 1 cm. The two blocks are separated by a distance of 2.5 cm and the wire is embedded 2 cm into each block, the total wire length being 6.5 cm. The blocks are pulled apart at 2 cm per minute parallel to the wire axis till the wire pulls out of one block.

TABLE 4

| | Comparison | 1 | Comparison | 2 | 3 | 4 |
|---|---|---|---|---|---|---|
| Chloroprene rubber | 100 | 100 | — | — | — | — |
| Styrene-butadiene rubber | — | — | 100 | 100 | — | — |
| Butadiene rubber | — | — | — | — | 100 | — |
| Isoprene rubber | — | — | — | — | — | 100 |
| ISAF Black | — | — | 70 | 28 | — | — |
| GPF Black | 70 | 28 | — | — | — | — |
| MPC Black | — | — | — | — | 28 | 28 |
| Hi-Sil 233 | — | 42 | — | 42 | 42 | 42 |
| Magnesium Oxide | 4 | 4 | — | — | — | — |
| Zinc Oxide | 5 | 5 | 5 | 5 | 10 | 10 |
| Pine Tar | — | — | — | — | 4 | 4 |
| Diphenylguanidine | 1 | 1 | — | — | — | — |
| Stearic Acid | — | — | 2 | 2 | — | — |
| Tricresyl phosphate | 10 | 10 | — | — | — | — |
| NOBS* | — | — | 1.3 | 1.3 | — | — |
| DM/CZ** | — | — | — | — | 0.5/0.5 | 0.5/0.5 |
| 810 NA*** | 1.5 | 1.5 | — | — | — | — |
| β-Phenyl Naphthyl Amine | — | — | — | — | 1 | 1 |
| Cobalt naphthenate | — | — | — | — | 5 | — |
| Sulfur | 1.5 | 1.5 | 1.5 | 1.5 | 3.5 | 3.5 |
| Vulcanization (minutes at 155° C.) | 50 | 50 | 40 | 40 | 30 | 30 |
| H-Test (Kgs/2cm) at 120° C. | 15 | 37 | 9 | 40 | 54 | 58 |

*n-oxydiethylene Benzothiazyl-2-sulfenamide
**Dibenzothiazyl disulfide/cyclohexyl-benzothiazyl-sulfenamide
***N-Phenyl-N'-isopropyl-p-phenylene diamine

EXAMPLE 4

Steel bead wires (d=0.96mm) were solvent degreased and cleaned as in Example 1 and then dipped into a styrene, butadiene, 2-vinyl pyridine terpolymer latex (composition 15:70:15, 12% resin solids) and then dried at 170° C. for 60 seconds. The coated bead wires were vulcanized in an H-test mold at 135° C. for 60 minutes under 60 Kg/cm$^2$ pressure with the following compounded natural rubber formulations. The test samples were aged 24 hours at room temperature after vulcanization and then heated to and tested at 120° C. using a test rate of 200mm/minute. As is clear from the data below, the bond strengths with the terpolymer adhesive increase rapidly with higher levels of silica in the rubbers. The examples with bentonite and activated clay show clearly that mineral fillers with silica contents of less than about 95% are not effective for providing improved bond strengths with these terpolymer adhesives.

Table 5

| TEST NO. | Comparison | 1 | 2 | 3 | 4 | 5 | 6 | Comparison | Comparison |
|---|---|---|---|---|---|---|---|---|---|
| Natural Rubber No. 1 (Smoked Sheet) | 100 | 100 | 100 | 100 | 100 | 100 | 100 | 100 | 100 |
| Stearic Acid | 1 | 1 | 1 | 1 | 1 | 1 | 1 | 1 | 1 |
| Zinc Oxide | 8 | 8 | 8 | 8 | 8 | 8 | 8 | 8 | 8 |
| Pine Tar | 3 | 3 | 3 | 3 | 3 | 3 | 3 | 3 | 3 |
| Phenyl β-Naphthylamine | 1 | 1 | 1 | 1 | 1 | 1 | 1 | 1 | 1 |
| 2-Mercaptobenzothiazole | 1.5 | 1.5 | 1.5 | 1.5 | 1.5 | 1.5 | 1.5 | 1.5 | 1.5 |
| Sulfur | 5 | 5 | 5 | 5 | 5 | 5 | 5 | 5 | 5 |
| Copper Naphthenate | 2.5 | 2.5 | 2.5 | 2.5 | 2.5 | — | — | — | — |
| Cobalt Naphthenate | — | — | — | — | — | 2.5 | 2.5 | 2.5 | 2.5 |
| HAF Black | 70 | 55 | 40 | 30 | 15 | 30 | 30 | 30 | 30 |
| Hi-Sil 233 | — | 15 | 30 | 40 | 55 | 40 | — | — | — |
| Syloid 244 | — | — | — | — | — | — | 40 | — | — |
| Bentonite | — | — | — | — | — | — | — | 40 | — |
| Activated Clay | — | — | — | — | — | — | — | — | 40 |
| H-Test (Kgs/2cm) at 120° C. | 7 | 27 | 39 | 52 | 36 | 51 | 44 | 14 | 2 |

Test No. 3 was repeated changing the test condition to room temperature. The adhesive strength measured by the H-test was 72Kg/2cm. Failures occured inside the rubber stock since pulled out wires from test blocks tested at both room temperature and 120° C. were covered by the rubber stock completely.

EXAMPLE 5

Example 4 was repeated with the following rubber formulations which contain no transition metal salts.

This shows that the presence of the transition metal salts, often needed to obtain good adhesion to a brass plated surface, is not necessary for good bond strength when using the adhesives of the present invention.

Table 6

| TEST NO. | Comparison | 1 | 2 | 3 | 4 | 5 |
|---|---|---|---|---|---|---|
| Natural Rubber (Smoked Sheet) | 100 | 100 | 100 | 100 | 100 | 100 |
| MPC Black | 70 | 65 | 60 | 55 | 40 | 15 |
| Hi-Sil 233 | — | 5 | 10 | 15 | 30 | 55 |
| Zinc Oxide | 8 | 8 | 8 | 8 | 8 | 8 |
| Stearic Acid | 1 | 1 | 1 | 1 | 1 | 1 |
| Pine Tar | 3 | 3 | 3 | 3 | 3 | 3 |
| Sulfur | 5 | 5 | 5 | 5 | 5 | 5 |
| Phenyl β-Naphthyl Amine | 1 | 1 | 1 | 1 | 1 | 1 |
| 2-Mercapto benzothiazole | 1.5 | 1.5 | 1.5 | 1.5 | 1.5 | 1.5 |
| H-Test Results Terpolymer Adhesive (Kgs/2cm) at 120° C. | 22 | 35 | 38 | 48 | 58 | 42 |

EXAMPLE 6

Steel bead wires (d=0.96mm) were solvent degreased and cleaned as in Example 1 and then dipped into the various latices listed in Table 8 (all ratios are on a weight basis; all latices were 12% resin solids). The coated wires were dried at 170° C. for 60 seconds, and then vulcanized in an H-test mold at 145° C. for 90 minutes under 60 Kg/cm² pressure with the following compounded natural rubber formulation.

Table 7

| Natural Rubber No. 1 (smoked Sheet) | 100 |
|---|---|
| MPC Black | 40 |
| Hi-Sil 233 | 30 |
| Zinc Oxide | 10 |
| Pine Tar | 4 |
| Phenyl β-Naphthyl Amine | 1 |
| 2(2,4 Dinitrophenol) Mercapto benzothiazole | 1 |
| Sulfur | 3.5 |
| Cobalt Naphthenate | 5 |

The following changes were made in the polymer composition:

Table 8

| Component in Latex / TEST NO. | Comparison | 1 | 2 | 3 | 4 | 5 | 6 | 7 | 8 | 9 | 10 | 11 | Comparison | 12 |
|---|---|---|---|---|---|---|---|---|---|---|---|---|---|---|
| 2-vinyl pyridine | — | 2 | — | — | 15 | — | — | 15 | 20 | 33 | 40 | 1 | — | 60 |
| 4-vinyl pyridine | — | — | 1 | — | — | 14 | — | — | — | — | — | — | — | — |
| 2-methyl-5-vinyl pyridine | — | — | — | 1 | — | — | 15 | — | — | — | — | — | — | — |
| Butadiene | 82 | 80 | 81 | 81 | 70 | 71 | 70 | — | 40 | 55 | 59 | 98 | 99 | 39 |
| Isoprene | — | — | — | — | — | — | — | 70 | — | — | — | — | — | — |
| Styrene | 18 | 18 | 18 | 18 | 15 | 15 | 15 | 15 | 40 | 12 | 1 | 1 | 1 | 1 |
| H-Test (Kgs/2cm) at 120° C. | 21 | 35 | 34 | 31 | 51 | 50 | 46 | 56 | 56 | 45 | 50 | 36 | 30 | 50 |

EXAMPLE 7

Steel bead wires (d=0.96mm) were solvent degreased and cleaned as in Example 1 and then dipped into a styrene, butadiene, 2-vinyl pyridine terpolymer latex (composition 1, 84, 15; 12% resin solids) and then dried at 170° C. for 60 seconds. The coated bead wires were vulcanized in an H-test mold at 155° C. under 60 Kgs/cm² pressure with the following compounded synthetic rubber formulations.

Table 9

| | Comparison | 1 | Comparison | 2 | 3 |
|---|---|---|---|---|---|
| Styrene butadiene rubber | 100 | 100 | — | — | — |
| Butadiene rubber | — | — | 100 | 100 | — |
| Isoprene rubber | — | — | — | — | 100 |
| ISAF Black | 70 | 28 | — | — | — |
| MPC Black | — | — | 70 | 28 | 28 |
| Hi-Sil 233 | — | 42 | — | 42 | 42 |
| Zinc Oxide | 5 | 5 | 10 | 10 | 10 |
| Pine Tar | — | — | 4 | 4 | 4 |

Table 9-continued

|  | Comparison | 1 | Comparison | 2 | 3 |
|---|---|---|---|---|---|
| Stearic Acid | 2 | 2 | — | — | — |
| NOBS* | 1.3 | 1.3 | — | — | — |
| DM** | — | — | 0.5 | 0.5 | 0.5 |
| CZ*** | — | — | 0.5 | 0.5 | 0.5 |
| β-Phenyl Naphthylamine | — | — | 1 | 1 | 1 |
| Cobalt Naphthenate | — | — | 5 | 5 | — |
| Sulfur | 1.5 | 1.5 | 3.5 | 3.5 | 3.5 |
| Vulcanization (Minutes at 155° C.) | 40 | 40 | 30 | 30 | 30 |
| H-Test (Kgs/2cm) at 120° C. | 3 | 33 | 27 | 52 | 55 |

*n-oxydiethylene Benzothiazyl-2-sulfenamide
**Dibenzothiazyl disulfide
***Cylohexyl-benzothiazyl-sulfenamide As many possible embodiments may be made of this invention without departing from the scope thereof, it is to be understood that all matter herein set forth is to be interpreted as illustrative and not as unduly limiting the invention.

What is claimed is:

1. In a process of bonding a rubber to a ferrous metal substrate wherein an adhesive is applied to said metal substrate and the rubber is contacted therewith and bonded by heat and pressure, the improvement comprising (1) using an adhesive consisting essentially of an interpolymer comprising about 39–99 percent by weight of a conjugated diene, about 1–60 percent by weight of a heterocyclic nitrogen base and 0 to about 40 percent by weight of at least one additional copolymerizable monomer and (2) using a rubber containing about 5–60 parts of silica filler per 100 parts of rubber, said silica having a purity on an anhydrous weight basis of at least 95 percent.

2. The process of claim 1 wherein said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

3. A process according to claim 1 wherein said heterocyclic nitrogen base has the formula

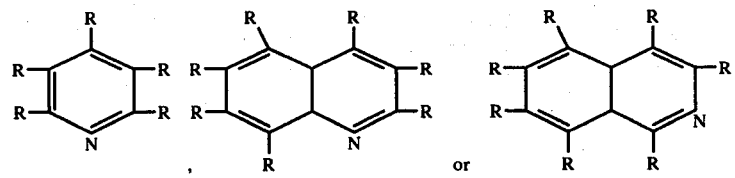

wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C<$ and the total number of carbon atoms in each R substituent being not greater than 15.

4. A process according to claim 1 wherein said heterocyclic nitrogen base is selected from the group consisting of 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alphamethylvinyl)-8-dodecyl quinoline; 3-vinylisoquinoline; 1,6-dimethyl-3-vinylisoquinoline; 2-vinyl-4-benzyl-quinoline; 3-vinyl-5-chloroethyl-quinoline; 3-vinyl-5,6-dichloroisoquinoline; 2-vinyl-6-ethoxy-7-methylquinoline and 3-vinyl-6-hydroxymethylisoquinoline.

5. A process according to claim 1 wherein said rubber is selected from the group consisting of natural rubber, polybutadiene, polyisoprene, copolymers of butadiene with styrene, copolymers of butadiene with acrylonitrile, and polychloroprene.

6. A process according to claim 1 wherein said interpolymer is a copolymer of butadiene and 2vinyl pyridine.

7. A process according to to claim 1 wherein said additional monomer is an organic compound containing at least one polymerizable ethylenic group.

8. A process according to claim 1 wherein said additional monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

9. A process accordingto claim 1 wherein said interpolymer is a terpolymer of styrene, butadiene and 2-vinyl pyridine.

10. A process according to claim 1 wherein said interpolymer is a terpolymer of 2-vinyl pyridine, isoprene and styrene.

11. A process according to claim 1 wherein said interpolymer is a terpolymer of 4-vinyl pyridine, butadiene and styrene.

12. A process according to claim 1 wherein said interpolymer is a terpolymer of 2-methyl-5-vinyl pyridine, butadiene and styrene.

13. A laminated article comprising a ferrous metal substrate having bonded thereto a rubber by means of an adhesive layer, said rubber containing about 5–60 parts of silica filler per 100 parts of rubber, said silica having a purity on an anhydrous weight basis of at least 95 percent and said adhesive consisting essentially of an interpolymer comprising about 39–99 percent be weight of a conjugated diene, about 1–60 percent by weight of heterocyclic nitrogen base and 0 to about 40 percent by weight of at least one additional copolymerizable monomer.

14. A laminated article according to claim 13 wherein, said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

15. A laminated article according to claim 13 wherein, said heterocyclic nitrogen base has the formula

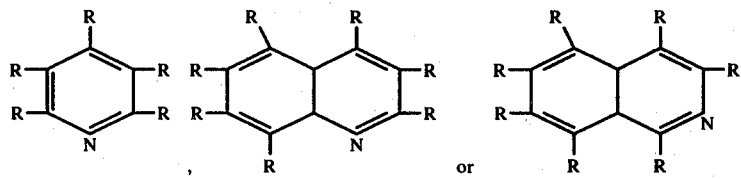

wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C<$ and the total number of carbon atoms in each R substituent being not greater than 15.

16. A laminated article according to claim 13 wherein, said heterocyclic nitrogen base is selected from the group consisting of 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alphamethylvinyl)-8-dodecyl quinoline; 3-vinylisoquinoline; 1,6-dimethyl-3-vinylisoquinoline; 2-vinyl-4-benzyl-quinoline; 3-vinyl-5-chloroethyl-quinoline; 3-vinyl-5,6-dichloroisoquinoline; 2-vinyl-6-ethoxy-7-methylquinoline and 3-vinyl-6-hydroxymethylisoquinoline.

17. A laminated article according to claim 13 wherein, said rubber is selected from the group consisting of natural rubber, polybutadiene, polyisoprene, copolymers of butadiene with styrene, copolymers of butadiene with acrylonitrile, and polychloroprene.

18. A laminated article according to claim 13 wherein, said interpolymer is a copolymer of butadiene and 2-vinyl pyridine.

19. A laminated article according to claim 13 wherein, said additional monomer is an organic compound containing at least one polymerizable ethylenic group.

20. A laminated article according to claim 13 wherein, said added monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

21. A laminated article according to claim 13 wherein, said interpolymer is a terpolymer of styrene, butadiene and 2-vinyl pyridine.

22. A laminated article according to claim 13 wherein, said interpolymer is a terpolymer of 2-vinyl pyridine, isoprene and styrene.

23. A laminated article according to claim 13 wherein, said interpolymer is a terpolymer of 4-vinyl pyridine, butadiene and styrene.

24. A laminated article according to claim 13 wherein, said interpolymer is a terpolymer of 2-methyl-5-vinyl pyridine, butadiene and styrene.

* * * * *

UNITED STATES PATENT AND TRADEMARK OFFICE
CERTIFICATE OF CORRECTION

PATENT NO. : 3,998,992
DATED : December 21, 1976
INVENTOR(S) : Hiroshi Nakamura

It is certified that error appears in the above-identified patent and that said Letters Patent are hereby corrected as shown below:

Column 1, lines 25 and 34, change "an" to --and--.

Columns 3 and 4, lines 27-36, change the formula to read as follows:

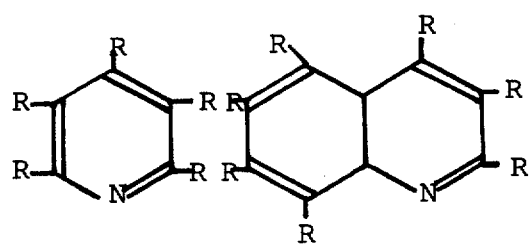    or    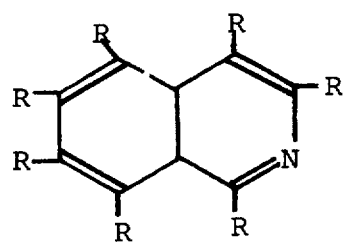

Column 5, lines 5, 6, and 8, change "hetrocyclic" to --heterocyclic--.

Column 5, line 35, change "ethacylate" to --ethacrylate--.

Column 7, line 24, change "be" to --by--.

Column 7, line 29, change "ar" to --are--.

Column 7, line 36, change "mate." to --mate,--.

Column 8, line 50, change "1/2 3.3" to --3.3--.

UNITED STATES PATENT AND TRADEMARK OFFICE
CERTIFICATE OF CORRECTION

PATENT NO. : 3,998,992
DATED : December 21, 1976
INVENTOR(S) : Hiroshi Nakamura

It is certified that error appears in the above-identified patent and that said Letters Patent are hereby corrected as shown below:

Columns 13 and 14, lines 44-52, and columns 15 and 16, lines 13-21, change the formula to read as follows:

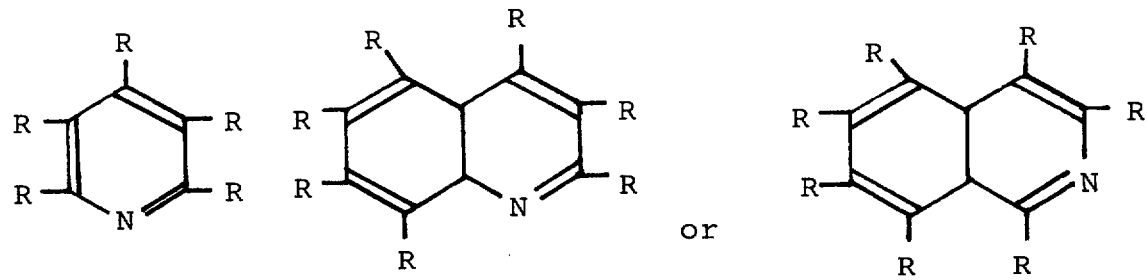

Column 14, line 67, change "be" to --by--.

Signed and Sealed this

Nineteenth Day of April 1977

[SEAL]

Attest:

RUTH C. MASON
Attesting Officer

C. MARSHALL DANN
Commissioner of Patents and Trademarks